United States Patent
Liu et al.

(10) Patent No.: US 10,707,737 B2
(45) Date of Patent: Jul. 7, 2020

(54) LINEAR VIBRATION MOTOR

(71) Applicant: GOERTEK INC., WeiFang, Shandong (CN)

(72) Inventors: Chunfa Liu, Shandong (CN); Fenglei Zu, Shandong (CN)

(73) Assignee: GOERTEK INC., Weifang, Shandong (CN)

( * ) Notice: Subject to any disclaimer, the term of this patent is extended or adjusted under 35 U.S.C. 154(b) by 218 days.

(21) Appl. No.: 15/778,764

(22) PCT Filed: May 18, 2016

(86) PCT No.: PCT/CN2016/082473
§ 371 (c)(1),
(2) Date: May 24, 2018

(87) PCT Pub. No.: WO2017/088359
PCT Pub. Date: Jun. 1, 2017

(65) Prior Publication Data
US 2018/0358878 A1 Dec. 13, 2018

(30) Foreign Application Priority Data
Nov. 25, 2015 (CN) .......................... 2015 1 0835597

(51) Int. Cl.
*H02K 33/18* (2006.01)
*H02K 33/02* (2006.01)
(Continued)

(52) U.S. Cl.
CPC .............. *H02K 33/02* (2013.01); *H02K 1/34* (2013.01); *H02K 5/04* (2013.01); *H02K 33/00* (2013.01); *H02K 33/18* (2013.01)

(58) Field of Classification Search
CPC .............................. H02K 33/14; H02K 33/18
(Continued)

(56) References Cited

U.S. PATENT DOCUMENTS

2004/0150277 A1* 8/2004 Moriyasu ............... H02K 33/18
310/81
2008/0284258 A1* 11/2008 Spratte .................... F03G 7/08
310/25
(Continued)

FOREIGN PATENT DOCUMENTS

CN 101221865 A 7/2008
CN 101383549 A 3/2009
(Continued)

OTHER PUBLICATIONS

International Search Report from International Application No. PCT/CN2016/082473 dated Sep. 1, 2016.
Chinese Office Action dated Aug. 15, 2017.

*Primary Examiner* — Hanh N Nguyen
(74) *Attorney, Agent, or Firm* — Brundidge & Stanger, P.C.

(57) ABSTRACT

A linear vibration motor comprising a housing, a vibrator, and a stator fixed on the housing and arranged parallel to the vibrator, push-pull magnets (4) are symmetrically disposed at two ends of the vibrator; push-pull coils (2) surrounding the push-pull magnets are fixedly disposed on the housing at positions corresponding to the push-pull magnets; after the push-pull coils are energized, the push-pull coils and the push-pull magnets generate push-pull forces in a horizontal direction, which provides a driving force for the reciprocating motion of the vibrator in a direction parallel to the plane in which the stator is located. The push-pull structure provides push-pull force for the reciprocation motion of the vibrator, so that an intense vibration force can be achieved.

19 Claims, 13 Drawing Sheets

(51) Int. Cl.
*H02K 33/00* (2006.01)
*H02K 1/34* (2006.01)
*H02K 5/04* (2006.01)

(58) Field of Classification Search
USPC .................................. 310/15, 17, 25, 28, 29
See application file for complete search history.

(56) References Cited

U.S. PATENT DOCUMENTS

2012/0169152 A1* 7/2012 Li ........................... H04M 1/03
    310/25
2016/0226363 A1* 8/2016 Mao ....................... H02K 33/16

FOREIGN PATENT DOCUMENTS

| CN | 103762815 A | 4/2014 |
|---|---|---|
| CN | 104617734 A | 5/2015 |
| CN | 104660106 A | 5/2015 |
| CN | 204597754 A | 8/2015 |
| CN | 105356710 A | 2/2016 |
| CN | 205178828 U | 4/2016 |
| JP | H08116658 A | 5/1996 |
| JP | H11155274 A | 6/1999 |

* cited by examiner

LINEAR VIBRATION MOTOR

TECHNICAL FIELD

The present invention relates to the field of consumer electronics technology, and more particularly, to a linear vibration motor applied to a portable consumer electronic product.

BACKGROUND ART

With the development of communication technology, portable electronic products such as mobile phones, handheld game players, or handheld multimedia entertainment devices have come up into people's lives. In these portable electronic products, micro vibration motors are generally used for providing system feedback, such as call prompts of mobile phones, vibration feedback of game players, and the like. However, with lightening and thinning development tendency of electronic products, various internal components of the electronic products also need to adapt to this tendency, and so is micro vibration motors.

The conventional micro vibration motor generally includes an upper cover, a lower cover that forms a vibration space with the upper cover, a vibrator (including a counter-weight block and a permanent magnet) that vibrates linearly and reciprocally in the vibration space, an elastic support component that connects to the upper cover and supports the vibrator's reciprocal vibration, and a coil located at a distance below the vibrator.

In the micro vibration motor with the above structure, the force driving the vibrator to vibrate is only provided by the magnetic field force between the vibrator and the coil. Since the force of the magnetic field between the vibrator and the coil is limited, the vibrator's vibrating force is relatively weak, and due to the change of the position of the vibrator relative to the coil during the process of vibration of the vibrator, the force applied to the vibrator is changed, and the response speed of the linear vibration is non-constant, resulting in a non-linear change in the vibration of the vibrator and affecting the vibration balance of the electronic product.

SUMMARY OF THE INVENTION

In order to solve the above technical problem, one object of the present invention is to provide a linear vibration motor, which provides push-pull force for the reciprocation motion of the vibrator by additional providing a push-pull structure, so as to drive the vibrator reciprocally move in a direction parallel to the plane in which the stator is located.

The present invention provides a linear vibration motor, comprising: a housing, a vibrator, and a stator fixed on the housing and arranged parallel to the vibrator, wherein, push-pull magnets are symmetrically disposed at two ends of the vibrator; push-pull coils surrounding the push-pull magnets are fixedly disposed on the housing at positions corresponding to the push-pull magnets, respectively; after the push-pull coils are energized, the push-pull coils and the push-pull magnets generate push-pull forces in a horizontal direction, which provides a driving force for a reciprocating motion of the vibrator in a direction parallel to a plane in which the stator is located.

Wherein, according to a preferred embodiment of the present invention, each of the push-pull magnets is a permanent magnet that is magnetized horizontally; and an axial direction of the push-pull coils is parallel to a magnetization direction of the push-pull magnets.

Wherein, according to a preferred embodiment of the present invention, a magnetic conductive block is fixedly attached to a surface of each of the push-pull magnets from which magnetic field lines of each of the push-pull magnets are emitted, so as to concentratedly conduct magnetic forces generated by the push-pull magnets.

Wherein, according to a preferred embodiment of the present invention, each of the push-pull magnets has a shape of square, trapezoidal, triangular or diamond.

Wherein, according to a preferred embodiment of the present invention, an elastic magnetic conductive member is provided between each of the push-pull magnets and the corresponding push-pull coil, one end of the elastic magnetic conductive member is fixed on one push-pull coil or a side wall of one push-pull magnet adjacent to the one push-pull coil, and the other end of the elastic magnetic conductive member is elastically contact with the side wall of the one push-pull magnet adjacent to the one push-pull coil or the one push-pull coil.

Wherein, according to a preferred embodiment of the present invention, each of the push-pull magnets is composed of two permanent magnets disposed adjacent to each other, and a magnetic conductive core disposed between the adjacent permanent magnets, polarities of adjacent ends of the adjacent permanent magnets are the same.

Wherein, according to a preferred embodiment of the present invention, the two adjacent permanent magnets are permanent magnets that are magnetized horizontally; and an axial direction of the push-pull coils is parallel to a magnetization direction of the push-pull magnets.

Wherein, according to a preferred embodiment of the present invention, the two adjacent permanent magnets are permanent magnets that are magnetized vertically; and an axial direction of the push-pull coils is perpendicular to a magnetization direction of the push-pull magnets.

Wherein, according to a preferred embodiment of the present invention, each of the push-pull magnets is an electromagnet.

Wherein, according to a preferred embodiment of the present invention, magnetic conductive fluid is filled between each of the push-pull coils and the corresponding push-pull magnet; and the magnetic conductive fluid is fixed on a surface of each of the push-pull magnets.

Wherein, according to a preferred embodiment of the present invention, the linear vibration motor further comprises push-pull coil bobbins, and the push-pull coils are wound on the push-pull coil bobbins, respectively.

Wherein, according to a preferred embodiment of the present invention, each of the push-pull coils is an overlapping wound coil.

Wherein, according to a preferred embodiment of the present invention, each of the push-pull coils is an irregularly wound coil, and wherein more wires are wound at a position where each of the push-pull coils concentratedly receives a magnetic field of the corresponding push-pull magnet.

Wherein, according to a preferred embodiment of the present invention, two ends of the vibrator are respectively provided with an elastic piece; and the elastic piece is limited between the vibrator and the housing.

Wherein, according to a preferred embodiment of the present invention, the stator includes stator coil(s) disposed at one side or both upper and lower sides of the vibrator and magnetic conductive core(s) located in the stator coil(s).

Wherein, according to a preferred embodiment of the present invention, the stator includes permanent magnet(s) disposed at one side or both upper and lower sides of the vibrator.

Wherein, according to a preferred embodiment of the present invention, the stator includes magnetic conductive block(s) disposed at one side or both upper and lower sides of the vibrator.

Wherein, according to a preferred embodiment of the present invention, the vibrator includes a counterweight block and a vibration block embedded and fixed in the counterweight block; and grooves for receiving the push-pull magnets are provided at two ends of the counterweight block.

Wherein, according to a preferred embodiment of the present invention, the vibration block includes three permanent magnets disposed adjacent to each other and magnetic conductive yokes disposed between any two adjacent permanent magnets, and polarities of adjacent ends of any two adjacent permanent magnets are the same; the stator includes stator coil(s) disposed at one side or both upper and lower sides of the vibrator, and magnetic conductive core(s) disposed in the stator coil(s), an axial direction of the stator coil(s) is perpendicular to a magnetizing direction of the permanent magnets of the vibration block, and the magnetic conductive yokes of the vibration block and the magnetic conductive core(s) in the stator coil(s) are misaligned; and a horizontal distance between the magnetic conductive yokes of the vibration block and the magnetic conductive core(s) in the stator coil(s) is in a numerical range of 0.1 mm to 0.3 mm.

The linear vibration motor according to the present invention get out of prior motor design concept, in which the motor is driven only by the magnetic force between the vibrator and the coil, and adopts an additional push-pull structure to provide a reciprocating push-pull force for the vibrator, thereby driving the vibrator reciprocally move in the direction parallel to the plane in which the stator is located, so as to improve the vibration force of the linear vibration motor.

To the accomplishment of the above and related objects, one or more aspects of the present invention include features which will be specifically described below and particularly depict in the claims. The following description and the annexed drawings set forth in detail certain illustrative aspects of the present invention. However, these aspects are only some of the various implementations to implement the principle of the present invention. In addition, the present invention is intended to include all such aspects and their equivalents.

BRIEF DESCRIPTION OF THE DRAWINGS

Other objects and results of the present invention will be more clearly understood by reading the following description referring to the drawings and the claims, and with a further understanding of the present invention. In the drawings:

Figure 1:
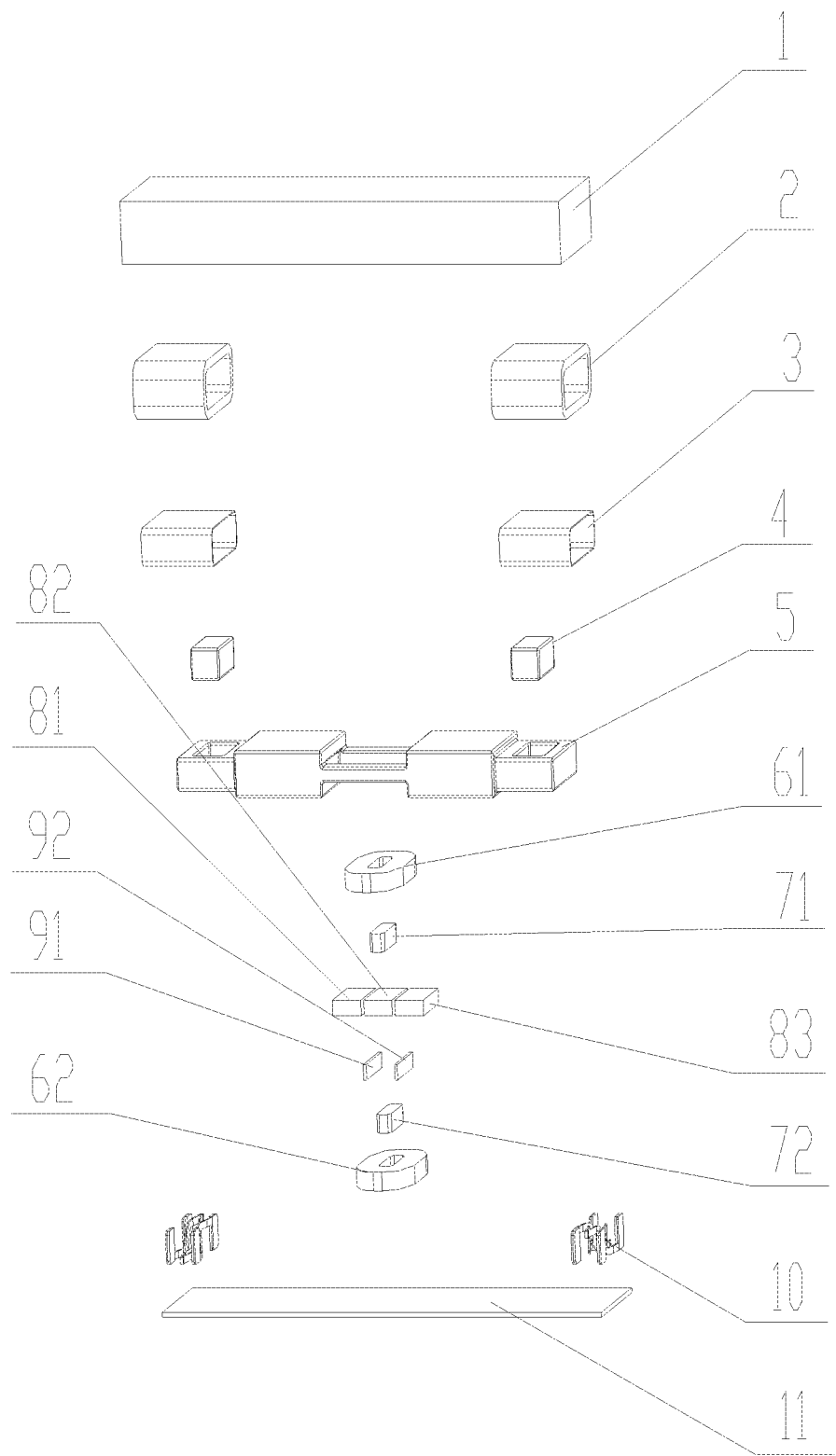
FIG. 1 is a schematic diagram of an exploded overall structure of a linear vibration motor according to an embodiment of the present invention.

In the drawings: upper housing 1; lower cover 11; push-pull coil 2; coil bobbin 3; push-pull magnet 4; magnetic conductive block 42; elastic magnetic conductive member 43; counterweight block 5; groove 51; groove 52; permanent magnets 81, 82, 83; magnetic conductive yokes 91, 92; stator coils 61, 62; magnetic conductive cores 71, 72; and elastic piece 10.

The same reference numbers indicate similar or corresponding features or functions throughout the appended drawings.

DETAILED DESCRIPTION OF THE EMBODIMENTS

In the following description, for the purposes of explanation, specific details are described in order to provide a full understanding of one or more embodiments. However, it will be apparent that these embodiments may also be practiced without these specific details. In other examples, in order to facilitate describing one or more embodiments, well-known structures and devices are shown in form of block.

The term "counterweight block" in the following description of specific embodiments may also be referred to as "mass block", and both of them refer to a high mass and high density metal block which is fixed to a vibration block that generates vibration for vibration balance.

In addition, the present invention is mainly focus on the improvement in micro vibration motors, but it does not exclude applying technology disclosed in the present invention to the large vibration motor. However, in order to facilitate describing, in the following description of the embodiments, "linear vibration motor" and "micro vibration motor" refer to the same thing.

Specific embodiments of the present invention will be described in detail below with reference to the accompanying drawings.

In order to solve the problem of the weak vibration force caused by the limited driving force provided by the magnet and the stator coil of the existing micro vibration motor structure, the linear vibration motor provided by the present invention has additionally provided push-pull structures at both ends of the vibrator, which provide push-pull force for the reciprocating motion of the vibrator, so as to provide an additional driving force for the reciprocating motion of the vibrator in a direction parallel to the plane in which the stator is located, and effectively improve the vibration force of the micro vibration motor without increasing the volume of the micro vibration motor.

Figure 2:
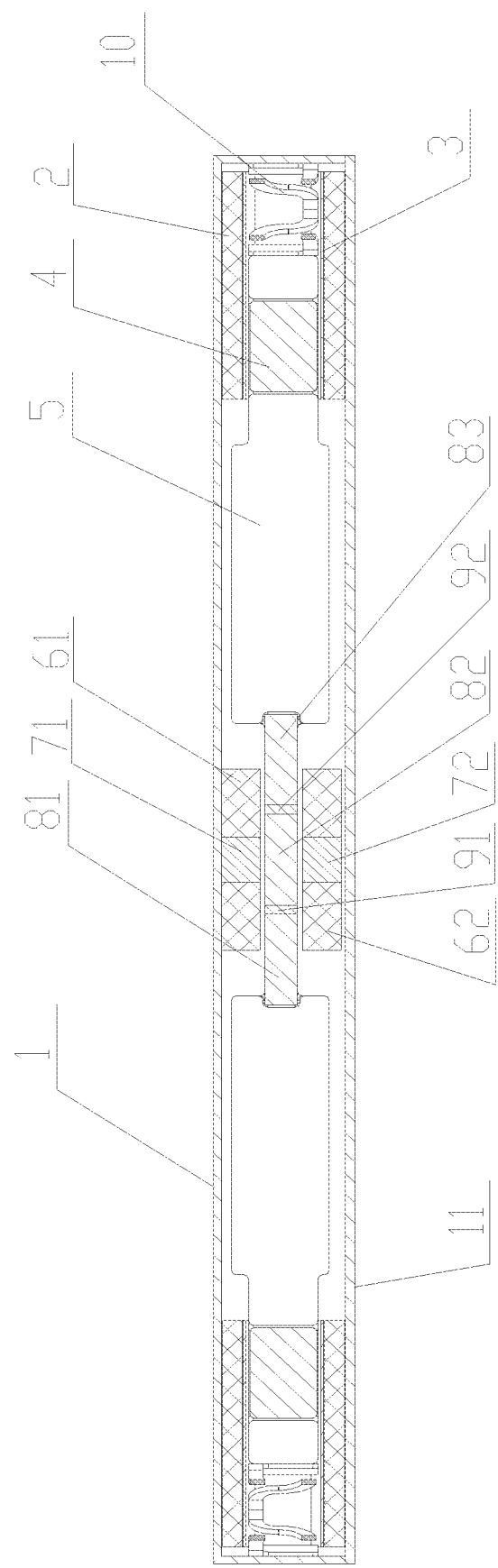
FIG. 2 is a schematic diagram of an assembled structure of a linear vibration motor according to an embodiment of the present invention.
Figure 3:
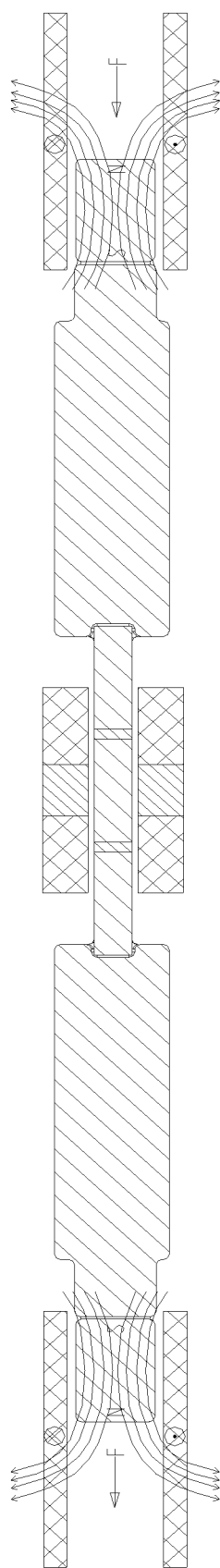
FIG. 3 is a schematic diagram illustrating the push-pull driving principle of a linear vibration motor according to an embodiment of the present invention.

Specifically, FIG. 1, FIG. 2, and FIG. 3 respectively show an exploded overall structure, an assembled structure, and the push-pull driving principle of the linear vibration motor according to an embodiment of the present invention.

As shown in FIGS. 1, 2 and 3, the linear vibration motor of the present embodiment mainly includes a housing, a vibrator, and a stator. The stator is fixed on the housing and is parallel to the vibrator. Wherein, the housing includes an upper housing 1 and a lower cover 11; the vibrator includes a counterweight block 5 and a vibration block embedded and fixed in the counterweight block 5. The vibration block includes permanent magnets and a magnetic conductive yoke coupled between the permanent magnets. The push-pull magnets 4 are symmetrically disposed at two ends of the vibrator, a push-pull coil 2 surrounding the push-pull magnet 4 is fixedly disposed on the housing at a position corresponding to the push-pull magnet 4, and the push-pull coil 2 is wound on the push-pull coil bobbin 3. The push-pull coil 2 and the push-pull magnet 4 generate push-pull forces in the horizontal direction after the push-pull coil 2 is energized, so as to provide a driving force for the reciprocating motion of the vibrator in a direction parallel to the plane in which the stator is located.

According to the vibration principle of the conventional motor, after the coil in the stator is energized, the permanent magnet in the vibration block and the coil in the stator generate push-pull forces that interacts, and the directions of the magnetic field lines of the magnetic field generated by the stator is changed by changing the direction of the current in the coil of the stator. Therefore, the vibrator is driven to, move reciprocally in a direction parallel to the plane in which the stator is located. However, in the micro vibration motor, due to the limitation on the volume of the micro vibration motor, the driving force that the original driving components can provide is extremely limited. Therefore, in the present invention, the drive structure combining the push-pull magnets additionally provided at two ends of the vibrator and the push-pull coils fixed on the housing can provide an additional driving force for the micro vibration motor, thereby effectively enhancing the vibration of the micro vibration motor without increasing the volume of the micro vibration motor.

Specifically, in the embodiment shown in FIG. 1 to FIG. 3, the vibration block is composed of three permanent magnets 81, 82, 83 disposed adjacent to each other and magnetic conductive yokes 91, 92 respectively disposed between the adjacent permanent magnets. The electromagnet in the stator includes two stator coils 61, 62 symmetrically disposed at the upper and lower sides of the vibrator, and magnetic conductive cores 71, 72 respectively disposed in the stator coils. The magnetic conductive yokes 91, 92 and the magnetic conductive cores 71, 72 are arranged in a staggered manner, and the axial direction of the stator coils 61, 62 is perpendicular to the magnetization direction of the permanent magnets of the vibration block.

The push-pull magnet 4 in the embodiment is a single permanent magnet that is magnetized in horizontal direction, and the axial direction of the push-pull coil 2 is parallel to the magnetization direction of the push-pull magnet 4. According to the schematic diagram of the push-pull driving principle shown in FIG. 3, it can be seen that the magnetic field lines generated by the push-pull magnet 4 respectively pass through the push-pull coil 2 vertically upward and downward. According to the left-hand rule that determines the direction of the force that the energized conductor is subjected to in the magnetic field, open your left hand so that the thumb is perpendicular to the other four fingers, and all in the same plane as the palm of your hand; let the magnetic field lines generated by the push-pull magnet 4 enter from the palm, and point the four fingers in the direction of the current, and then the direction of the thumb is the direction of the ampere force that the energized wire (i.e., the push-pull coil 2) is subjected to in the magnetic field generated by the push-pull magnet 4. According to the direction of the current in the coil in FIG. 3, the direction of the current indicated by "□" is perpendicular to the drawing plane and directed outward, and the direction of the current indicated by "⊗" is perpendicular to the drawing plane and directed inward. Thus a rightward force is applied to the coil. Since the coil is fixed and immovable, the push-pull magnet is subjected to a leftward force F based on the relationship between the acting force and the reacting force. In this way, the push-pull magnets 4 fixedly arranged at both ends of the vibrator are driven by the leftward driving force to drive the counterweight block together to move to the left. Similarly, when the current direction changes, according to the left-hand rule, the coil is subjected to a leftward magnetic force, but because the coil is fixed and immovable, the permanent magnet is subjected to the rightward acting force with opposite direction and the same magnitude. The push-pull magnet subjected to the rightward acting force drives the counterweight block together to move to the right. The above-mentioned movements are alternately performed, which can independently drive the micro vibration motor to vibrate, or can also drive the micro vibration motor to vibrate in conjunction with the original driving components of the micro vibration motor.

Figure 4:
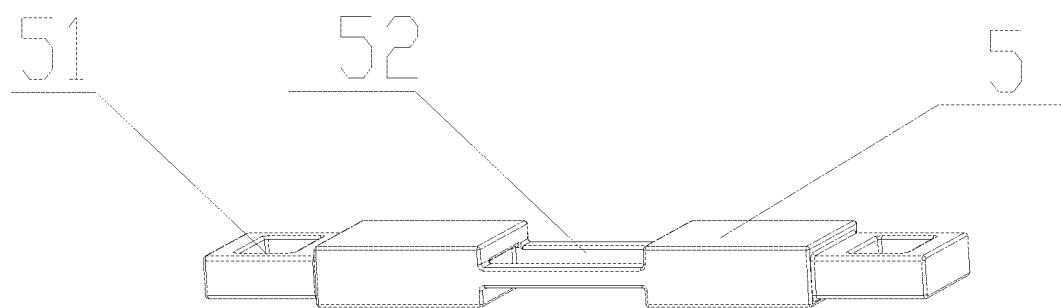
FIG. 4 is a schematic structural diagram of a counterweight block according to an embodiment of the present invention.

FIG. 4 shows the structure of a counterweight block according to an embodiment of the present invention.

As shown in FIG. 4, in this embodiment, the counterweight block 5 is an integral structure. In the middle of the counterweight block 5, a receiving groove 52 for receiving the vibration block is disposed. Both ends of the counterweight block are provided with grooves 51 for receiving push-pull magnets. In addition, an avoiding structure for avoiding the stator is further provided in the middle portion of the counterweight block. The receiving groove 52 for receiving the vibration block is located at the center position of the avoiding structure. In the specific assembly process of the counterweight block, the permanent magnets and the magnetic conductive yokes constituting the vibration block may be first fixed together, and then the vibration block may be integrally fixed in the receiving groove 52 by means of gluing or laser welding. The pull-push magnet 4 can also be fixed in the groove 51 in a similar manner.

The counterweight block 5 may be made of a tungsten steel block or a nickel steel block, or a high density metal material such as a nickel-tungsten alloy to increase the vibration force and make the vibration of the electronic product more intense.

As can be seen from FIGS. 2 and 4, since the counterweight block 5 is provided with grooves 51 receiving the push-pull magnets at both ends thereof, the addition of push-pull magnets do not increase the length or thickness of the vibrator, and the push-pull coils provided around the push-pull magnets is fixed on the housing, thus the vibration avoiding space in the conventional motor structure can be utilized, and this also does not increase the volume of the micro vibration motor.

In order to prevent the magnetic field lines generated by the push-pull magnets 4 from being over dispersed and affecting their magnetic density through the push-pull coils, in a preferred embodiment of the present invention, a magnetic conductive block is fixedly attached to a surface of the push-pull magnet 4 from which magnetic field lines of the push-pull magnet 4 are emitted to concentrate the magnetic field lines emitted from the push-pull magnet 4, so that the magnetic forces generated by the push-pull magnet are concentratedly conducted to the push-pull coil, and the utilization ratio of the magnetic field generated by the push-pull magnet 4 is increased.

Figure 5:
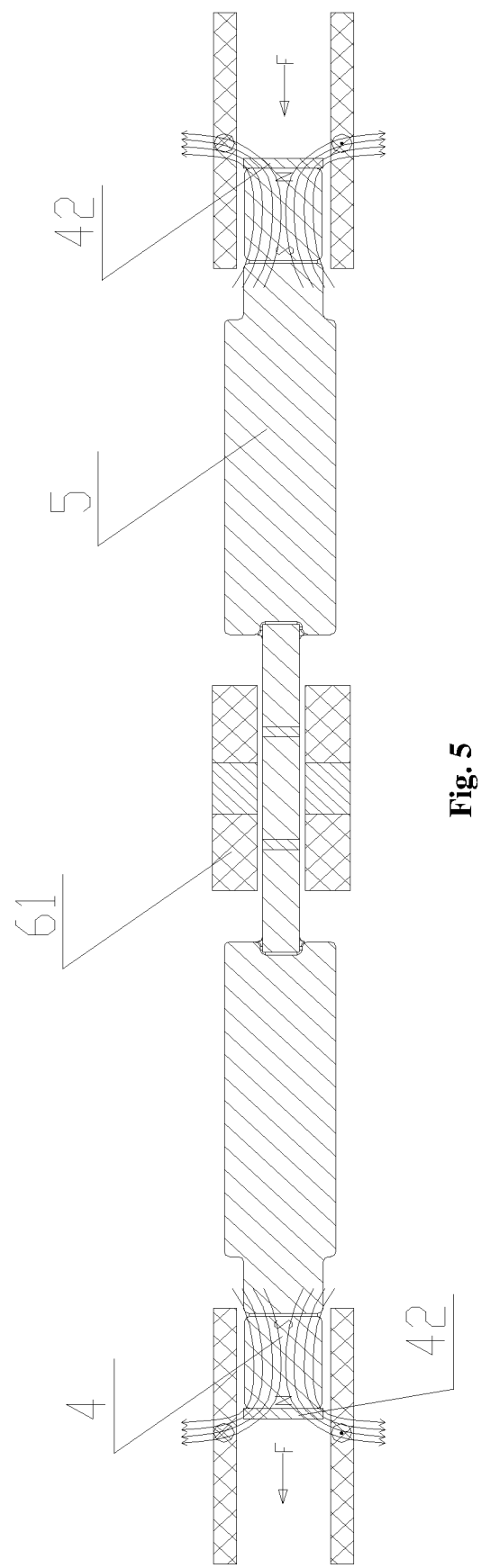
FIG. 5 is a schematic diagram illustrating the push-pull driving principle of a square push-pull magnet attached with a magnetic conductive block according to an embodiment of the present invention.

FIG. 5 shows the principle of push-pull driving of a square push-pull magnet attached with a magnetic conductive block. As shown in FIG. 5, a magnetic conductive block 42 is affixed to the surface of the push-pull magnet 4 from which magnetic field lines of the push-pull magnet 4 are emitted (i.e., the N pole surface). Under the magnetic guidance of the magnetic conductive block 42, the magnetic field lines emitted from the push-pull magnet 4 are concentratedly conducted to the push-pull coil, and the magnetic field utilization ratio of the push-pull magnet 4 is improved.

Figure 6:
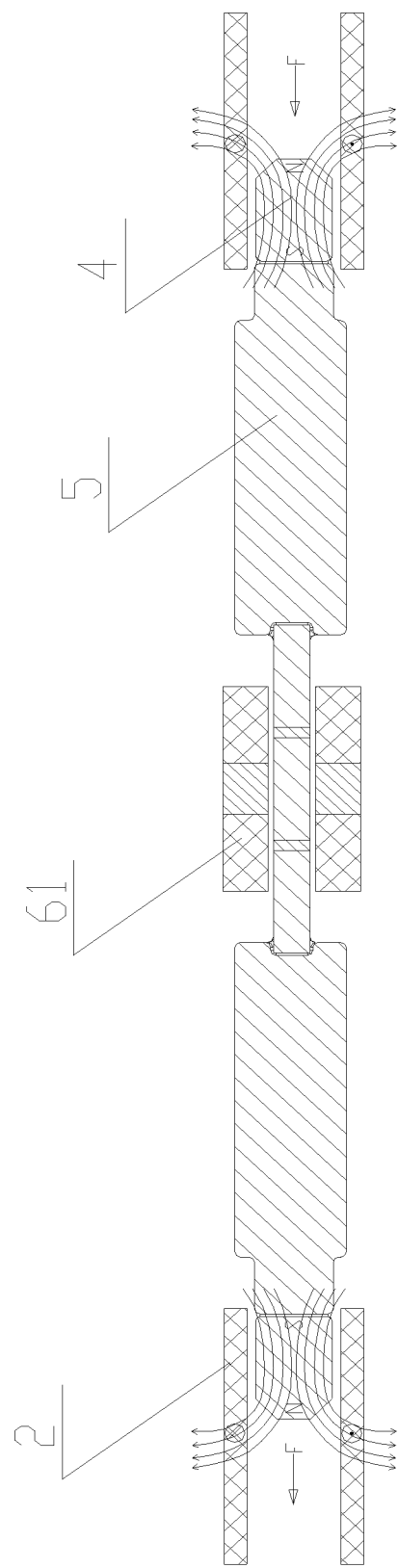
FIG. 6 is a schematic diagram illustrating the push-pull driving principle of a push-pull magnet having irregular shape according to an embodiment of the present invention.
Figure 7A:
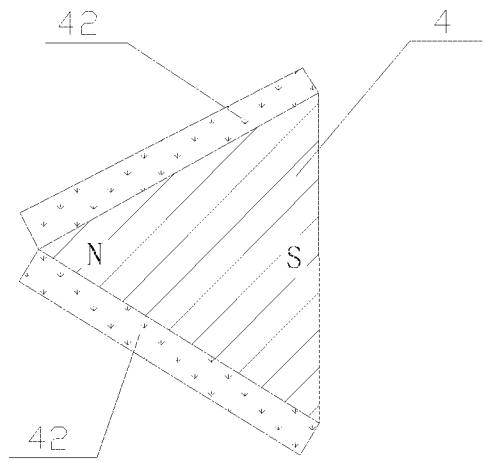
FIGS. 7a to 7c are schematic diagrams each of which illustrates a push-pull magnet attached with a magnetic conductive block according to an embodiment of the present invention.
Figure 7B:
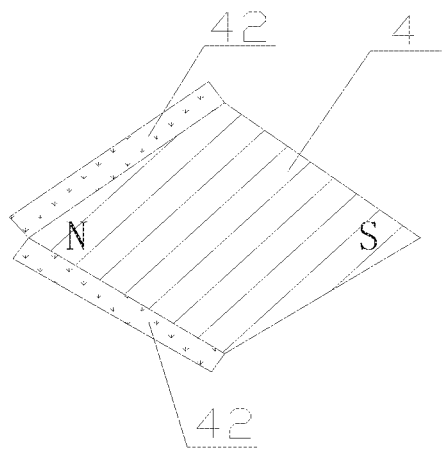
Figure 7C:
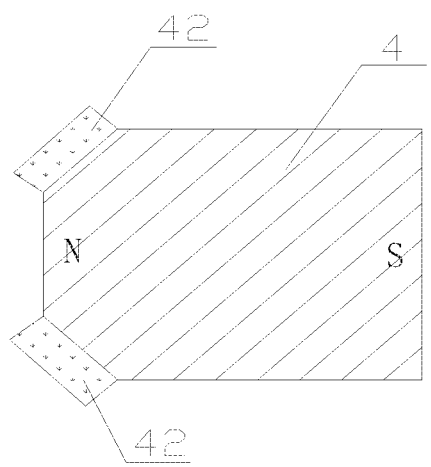

In addition to the square magnet shown in FIG. 5, trapezoidal, triangular, diamond or other possible shaped push-pull magnets may also be used to adapt to the specific design requirements of the linear vibration motor, or using the specific shape of the magnets and the manner of attaching the magnetic conductive blocks to improve the magnetic field utilization ratio of the push-pull magnet 4. FIG. 6 is a schematic diagram of the push-pull driving principle of an irregularly shaped push-pull magnet according to an embodiment of the present invention, and FIGS. 7a to 7c are schematic diagrams of a few of push-pull magnets having specific shapes attached with magnetic conducting blocks according to an embodiment of the present invention.

Another solution to improve the magnetic field utilization ratio of the push-pull magnet 4 is to add an elastic magnetic conductive member between the push-pull magnet and the push-pull coil. That is, one end of the elastic magnetic conductive member may be fixed on the push-pull coil, and the other end of the elastic magnetic conductive member may be in elastic contact with the push-pull magnet (generally, the side wall of the push-pull magnet adjacent to the push-pull coil); or, one end of the elastic magnetic conductive member may be fixed on the push-pull magnet (generally the side wall of the push-pull magnet adjacent to the push-pull coil), and the other end of the elastic magnetic conductive member is in elastic contact with the push-pull coil. The elastic magnetic conductive member may also be defined between the push-pull magnet and the push-pull coil in such a way that define the active space by engaging. For example, the push-pull magnet and the push-pull coil are respectively provided with an engaging groove, so that two ends of the elastic magnetic conductive member can be engaged in the engaging grooves on the push-pull magnet and the push-pull coil, and can move in the space defined by the engaging groove.

Figure 8:
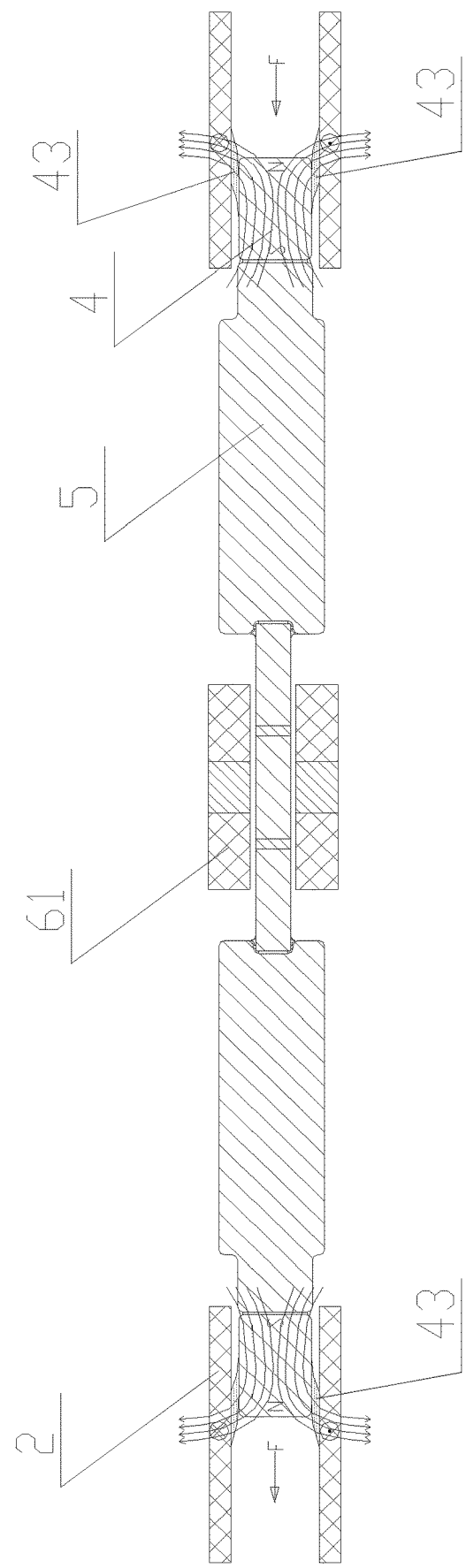
FIG. 8 is a schematic diagram illustrating the push-pull driving principle of adding an elastic magnetic conductive member between a push-pull magnet and a push-pull coil according to an embodiment of the present invention.

FIG. 8 is a schematic diagram of the push-pull driving principle in the case that an elastic magnetic conductive member is further provided between the push-pull magnet and the push-pull coil according to an embodiment of the present invention. As shown in FIG. 8, the elastic magnetic conductive members 43 are disposed at the upper and lower sides of the push-pull magnet 4, located between the push-pull magnet 4 and the push-pull coil 2, so that conducts the magnetic field lines of the push-pull magnet 4 pass through the push-pull coil 2 in a more concentrated manner.

In addition, it is also possible to fill magnetic conductive fluid between the push-pull coil and the push-pull magnet to improve the magnetic conductance and density between the push-pull coil and the push-pull magnet. The magnetic conductive fluid can be fixed on the surface of the push-pull magnet or can be fixed on the inner surface of the push-pull coil.

Limited by the looseness of when winding the coil and the strength of the coil itself, in a specific embodiment of the present invention, a push-pull coil bobbin 3 is further provided, and the push-pull coil is wound on the push-pull coil bobbin 3. In the process of winding the push-pull coil, it is possible to increase the winding wire per unit area by overlapping the wound coil, thereby enhancing the acting force between the push-pull coil and the push-pull magnet. In addition, considering the magnetic field distribution of the push-pull magnet, the magnetic induction intensity that can be received is different at different positions of the push-pull coil. The push-pull coil can also be designed as an irregularly wound coil, i.e., winding more wires at the position where the push-pull coil receives more push-pull magnetic field of the push-pull magnet, to increase the magnetic field utilization ration of the push-pull magnet.

Figure 9:
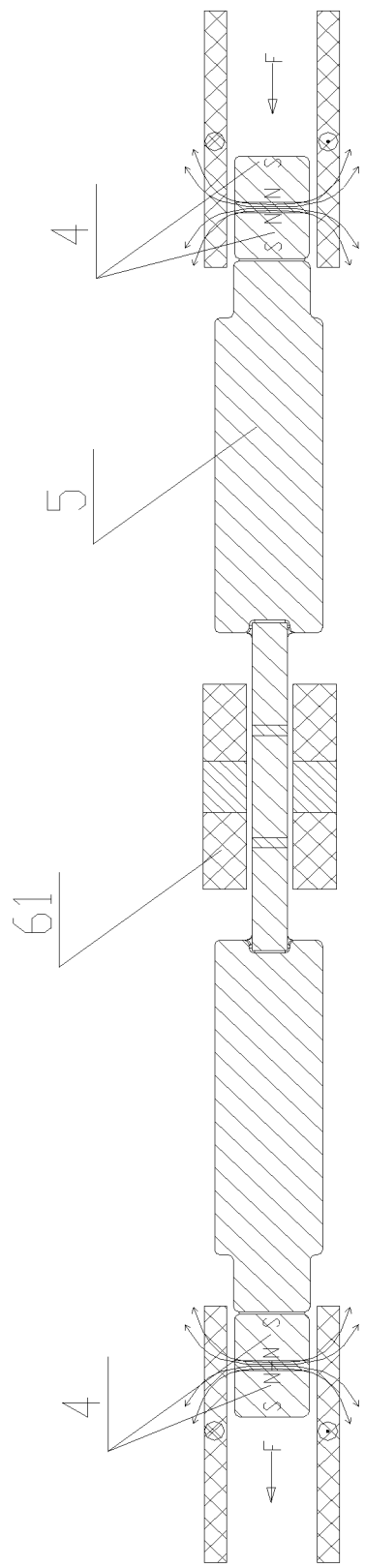
FIG. 9 is a schematic diagram illustrating the push-pull driving principle of a push-pull magnet formed by combining two permanent magnets according to an embodiment of the present invention.
Figure 10:
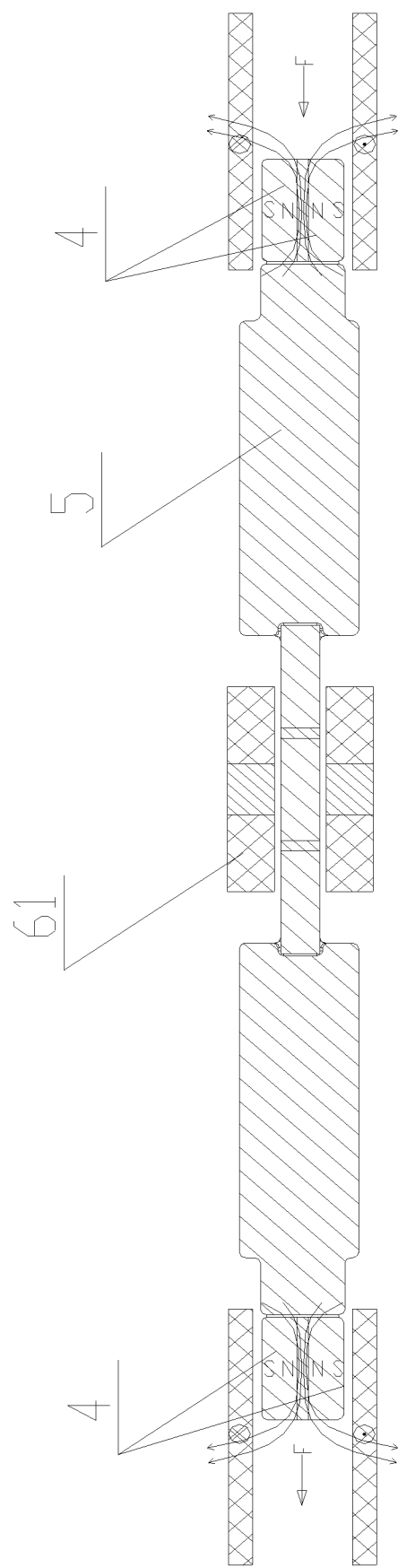
FIG. 10 is a schematic diagram illustrating the push-pull driving principle of a push-pull magnet formed by combining two permanent magnets according to another embodiment of the present invention.
Figure 11:
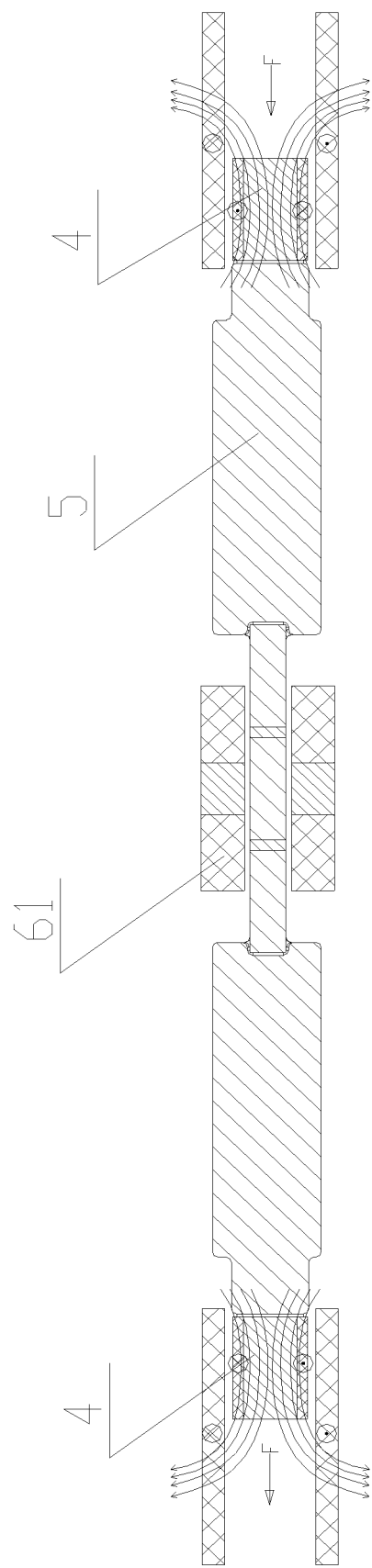
FIG. 11 is a schematic diagram illustrating the push-pull driving principle of a push-pull magnet formed by an electromagnet according to an embodiment of the present invention.
Figure 12A:
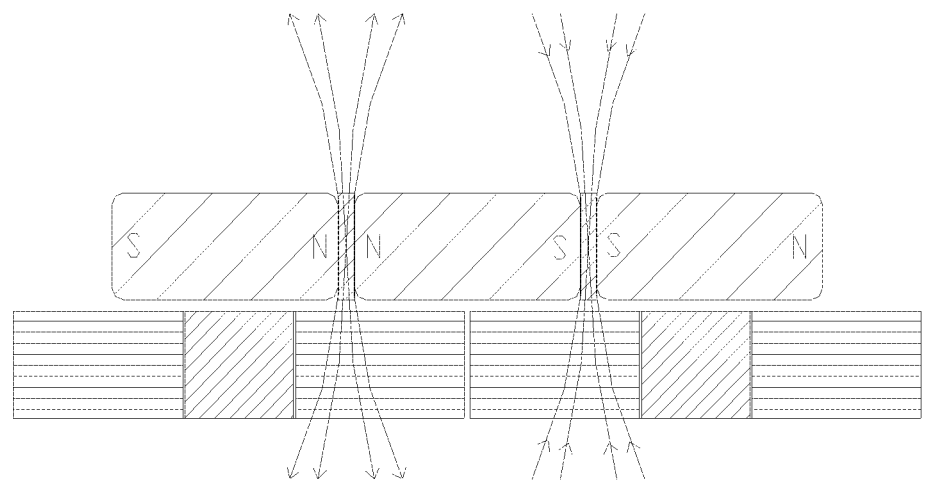
FIGS. 12a to 12d are schematic diagrams each of which illustrates an assembled structure of a vibration block and a stator according to an embodiment of the present invention.
Figure 12B:
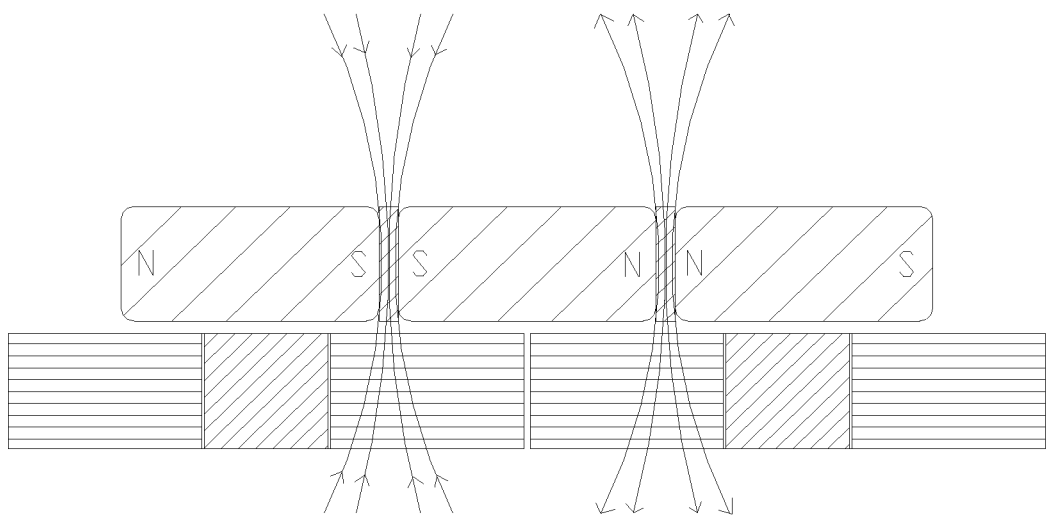
Figure 12C:
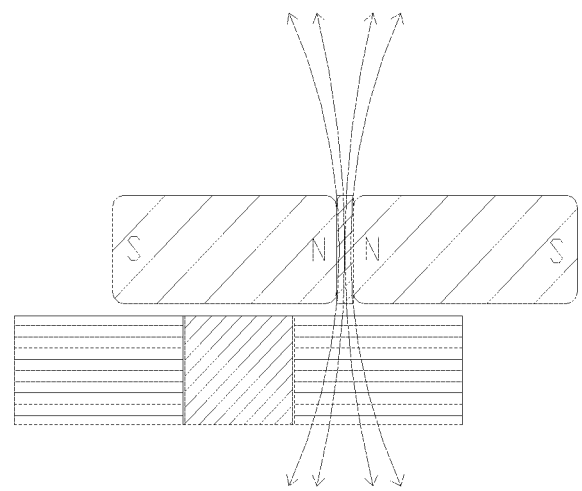
Figure 12D:
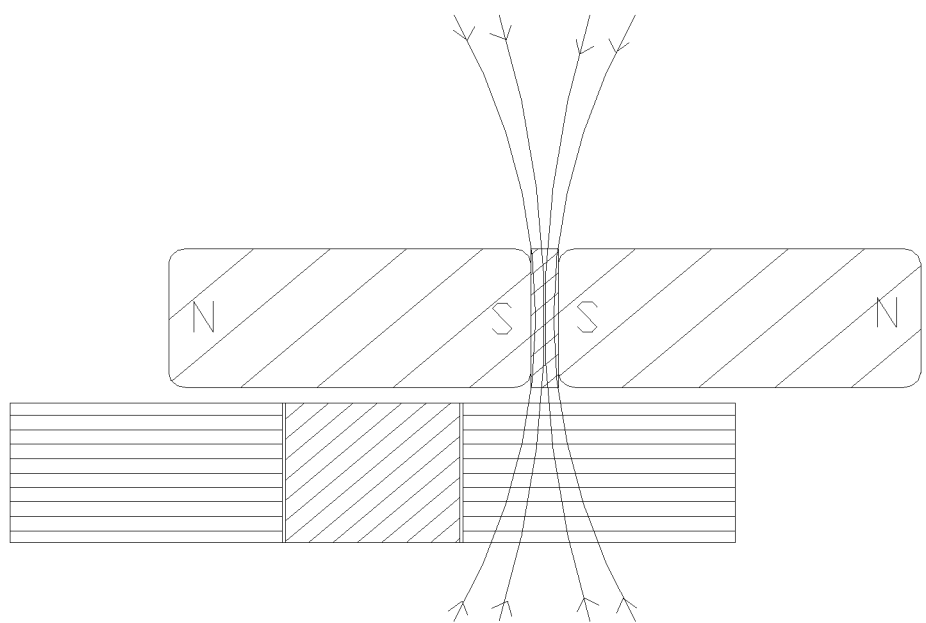

In the foregoing embodiments, the push-pull magnet 4 is implemented as a single permanent magnet. However, in an actual application design, the push-pull magnet may also be designed as an electromagnet or a combined structure composed of a plurality of permanent magnets or magnets. Each of FIG. 9 and FIG. 10 illustrates the push-pull driving principle of a push-pull magnet composed of two permanent magnets. FIG. 11 shows the push-pull driving principle of a push-pull magnet formed by an electromagnet.

In the push-pull magnet structure composed of two pieces of permanent magnets shown in FIG. 9, the two permanent magnets constituting the push-pull magnet are arranged parallelly in the X direction with the same poles of them facing each other. That is, the magnetizing directions of the two permanent magnets is parallel to the axial direction of the push-pull coil (generally, on the same straight line), two permanent magnets are adjacently arranged, and the polarities of the adjacent ends are the same, and a magnetic conductive core is arranged between the two permanent magnets. The push-pull driving principle thereof is the same as the push-pull driving principle in which a single permanent magnet constitutes the push-pull magnet in the first embodiment.

As shown in FIG. 9, since the N poles of the two permanent magnets forming the push-pull magnet are facing each other, the generated magnetic field lines respectively pass through the push-pull coil 2 vertically upward and downward, and according to the left-hand rule, the coil is subjected to a rightward force, and the push-pull magnet is subjected to a leftward force F. Thus, the push-pull magnets fixedly provided at both ends of the vibrator are driven by the leftward driving force to move left along with the counterweight block. Similarly, when the direction of the current changes, according to the left-hand rule, the coil is subjected to a leftward magnetic force, the push-pull magnet is subjected to a rightward force with opposite direction and the same magnitude, and the push-pull magnet subjected to the rightward driving force moves to right along with the counterweight block.

In the push-pull magnet structure composed of two permanent magnets shown in FIG. 10, the two permanent magnets constituting the push-pull magnet are arranged in parallel in the Z direction with the same poles of them facing each other. That is, the two permanent magnets are vertically magnetized permanent magnets, and the magnetization direction is perpendicular to the axial direction of the push-pull coil. The two permanent magnets are arranged adjacent to each other, and the polarities of the adjacent ends are the same. A magnetic conductive core is disposed between the two permanent magnets, and the push-pull driving principle thereof is the same as above.

In the push-pull structure shown in FIG. 11 which consists of an electromagnet constituting a push-pull magnet, the coil axis of the electromagnet and the axis of the push-pull coil are in the same straight line, and in the symmetrical structure of the linear vibration motor, the winding of the coil of one set of the push-pull magnet and the winding of the coil of the other set of push-pull magnet are opposite in direction to ensure that the acting forces of the push-pull coil and the push-pull magnet at the left and right sides can maintain the same direction. The push-pull driving principle thereof is the same as the push-pull driving principle in which a single permanent magnet constitutes a push-pull magnet in the first embodiment.

In the embodiment of the present invention, vibration reduction and collision avoiding during vibration of the vibrator are achieved through elastic pieces disposed at two ends of the vibrator. As shown in FIG. 1 to FIG. 3, the elastic plate 10 is limited and fixed between the vibrator and the housing. The vibrator presses the elastic piece at one end during the vibration of the vibrator. The pressed elastic piece can prevent the vibrator from colliding with the housing during vibration. At the same time, the pressed elastic piece can also provide the elastic recovery force in the opposite direction for the vibration of the vibrator.

In the above embodiments, the stator include stator coils respectively disposed at the upper and lower sides of the vibrator and magnetic conductive cores positioned in the center of the stator coils. However, in an actual application design, the structures of the stator and the vibrator are not limited to the "sandwich" structure described in the above embodiments, and the stator may be disposed at only one side of the vibrator.

In the linear vibration motor of the present invention, the role of the stator fixed to the housing is to provide a driving force for the reciprocating movement of the vibrator. Therefore, the stator is not limited to the stator coil and the magnetic conductive core structure described in the above embodiments. A permanent magnet provided at one side of the vibrator or permanent magnets provided at upper and lower sides of the vibrator may also be used as a stator. More specifically, since the linear motor provided by the present invention has an additional driving structure: a push-pull structure composed of push-pull magnets and push-pull coils disposed at two ends of the vibrator, thus a magnetic conductive block disposed at one side of the vibrator, or magnetic conductive blocks disposed at upper and lower sides of the vibrator may also be used as a stator.

In addition, in the above embodiments, the vibration block includes three permanent magnets 81, 82, 83 disposed adjacent to each other and magnetic conductive yokes 91, 92 disposed between the adjacent permanent magnets, and the adjacent ends of two adjacent permanent magnets have the same polarity. That is, they are arranged in the order of S-N, N-S, S-N or N-S, S-N, N-S. The magnetic conductive yoke is arranged between the adjacent permanent magnets, and the magnetization direction of the permanent magnets is vertical to the axis direction of the stator coil. Here, the axis direction of the stator coil is the direction of the central axis of the stator coil and the magnetic conductive core therein.

Since repulsive forces are generated between the adjacent ends of the two permanent magnets have the same polarities, magnetic field lines of the permanent magnets can be concentrated to pass through the magnetic conductive yoke between the two adjacent permanent magnets and the stator coil disposed under the vibration block. Such designed structure can minimize the space occupied by the stator and the vibrator, and can also increase the magnetic flux passing through the coil as much as possible.

The above embodiments in which the vibrating block comprising three permanent magnets is disposed with one electromagnet at each side of its upper side and lower side are not the only way that the present invention can be implemented, and the present invention are not limited to the above structures in the specific application process, and may also select the number, the type (electromagnet, permanent magnet, magnetic conductive core, etc.), and the combination manner of the member(s) of the stator, and the number, the type (electromagnet, permanent magnet, magnetic conductive core, etc.), and the combination manner of permanent magnets that constitute the vibration block based on the required vibration force of the product to which the present invention is applied. Other combination structures of the vibrating block and the stator are shown in FIGS. 12a to 12d.

In the above embodiments, the magnetic conductive yokes in the vibration block and the magnetic conductive cores in the stator are arranged in a misaligned manner, and the horizontal distance between the magnetic conductive yoke in the vibration block and the magnetic conductive core in the stator corresponding to the magnetic conductive yoke in the vibration block is in a numerical range of 0.1 mm to 0.3 mm. That is, the horizontal distance between the centerline of each magnetic conductive yoke and the centerline of the magnetic conductive core of the corresponding (i.e., the nearest) stator is 0.1 to 0.3 mm. Then, the left-right offset distance between the center axis of the vibration block when the vibration block drives the counterweight block to move reciprocally and the center axis of the vibration block in stationary state, is 0.2 mm. Accordingly, the distance from the edge of the avoiding structure to the outer edge of the stator should be slightly larger than 0.2 mm.

In addition, the linear vibration motor provided by the present invention further includes a flexible printed circuit board (FPCB). The stator may be fixed on the FPCB. The stator coil leads are connected with the external circuit through the circuit of the FPCB, and the FPCB is fixed to the housing.

The linear vibration motor according to the present invention is described by referring to the appended drawings. However, it should be understood for those skilled in the art that various modifications can be made to the linear vibration motor provided by the present invention without departing from the scope of the present invention, and the protection scope of the present invention should be defined by the appended claims.

What is claimed is:

1. A linear vibration motor, comprising a housing, a vibrator, and a stator fixed on the housing and arranged parallel to the vibrator, wherein
   push-pull magnets are symmetrically disposed at two ends of the vibrator;
   push-pull coils surrounding the push-pull magnets are fixedly disposed on the housing at positions corresponding to the push-pull magnets, respectively; and
   after the push-pull coils are energized, the push-pull coils and the push-pull magnets generate push-pull forces in a horizontal direction, which provides a driving force for a reciprocating motion of the vibrator in a direction parallel to a plane in which the stator is located.

2. The linear vibration motor of claim 1, wherein
   each of the push-pull magnets is a permanent magnet that is magnetized horizontally; and
   an axial direction of the push-pull coils is parallel to a magnetization direction of the push-pull magnets.

3. The linear vibration motor of claim 2, wherein a magnetic conductive block is fixedly attached to a surface of each of the push-pull magnets from which magnetic field lines of each of the push-pull magnets are emitted, so as to concentratedly conduct magnetic forces generated by the push-pull magnets.

4. The linear vibration motor of claim 2, wherein each of the push-pull magnets has a shape of square, trapezoidal, triangular or diamond.

5. The linear vibration motor of claim 2, wherein
   an elastic magnetic conductive member is provided between each of the push-pull magnets and the corresponding push-pull coil; and
   one end of the elastic magnetic conductive member is fixed on one push-pull coil or a side wall of one push-pull magnet adjacent to the one push-pull coil, and another end of the elastic magnetic conductive member is elastically contact with the side wall of the one push-pull magnet adjacent to the one push-pull coil or the one push-pull coil.

6. The linear vibration motor of claim 1, wherein each of the push-pull magnets is composed of two permanent magnets disposed adjacent to each other, and a magnetic conductive core disposed between the adjacent permanent magnets, and polarities of adjacent ends of the adjacent permanent magnets are the same.

7. The linear vibration motor of claim 6, wherein
   the two adjacent permanent magnets are permanent magnets that are magnetized horizontally; and
   an axial direction of the push-pull coils is parallel to a magnetization direction of the push-pull magnets.

8. The linear vibration motor of claim 6, wherein
   the two adjacent permanent magnets are permanent magnets that are magnetized vertically; and
   an axial direction of the push-pull coils is perpendicular to a magnetization direction of the push-pull magnets.

9. The linear vibration motor of claim 1, wherein each of the push-pull magnets is an electromagnet.

10. The linear vibration motor of claim 1, wherein
    magnetic conductive fluid is filled between each of the push-pull coils and the corresponding push-pull magnet; and
    the magnetic conductive fluid is fixed on a surface of each of the push-pull magnets.

11. The linear vibration motor of claim 1, wherein the linear vibration motor further comprises push-pull coil bobbins, and the push-pull coils are wound on the push-pull coil bobbins, respectively.

12. The linear vibration motor of claim 1, wherein each of the push-pull coils is an overlapping wound coil.

13. The linear vibration motor of claim 1, wherein each of the push-pull coils is an irregularly wound coil, and wherein more wires are wound at a position where each of the push-pull coils concentratedly receives a magnetic field of the corresponding push-pull magnet.

14. The linear vibration motor of claim 1, wherein
    two ends of the vibrator are respectively provided with an elastic piece; and
    the elastic piece is limited between the vibrator and the housing.

15. The linear vibration motor of claim 1, wherein the stator includes stator coil(s) disposed at one side or both upper and lower sides of the vibrator and magnetic conductive core(s) located in the stator coil(s).

16. The linear vibration motor of claim 1, wherein the stator includes permanent magnet(s) disposed at one side or both upper and lower sides of the vibrator.

17. The linear vibration motor of claim 1, wherein the stator includes magnetic conductive block(s) disposed at one side or both upper and lower sides of the vibrator.

18. The linear vibration motor of claim 1, wherein
    the vibrator includes a counterweight block and a vibration block embedded and fixed in the counterweight block; and
    grooves for receiving the push-pull magnets are provided at two ends of the counterweight block.

19. The linear vibration motor of claim 18, wherein
    the vibration block includes three permanent magnets disposed adjacent to each other and magnetic conductive yokes disposed between any two adjacent permanent magnets, and polarities of adjacent ends of any two adjacent permanent magnets are the same;
    the stator includes stator coil(s) disposed at one side or both upper and lower sides of the vibrator, and magnetic conductive core(s) disposed in the stator coil(s), an axial direction of the stator coil(s) is perpendicular to a magnetizing direction of the permanent magnets of the vibration block, and the magnetic conductive yokes of the vibration block and the magnetic conductive core(s) in the stator coil(s) are misaligned; and
    a horizontal distance between the magnetic conductive yokes of the vibration block and the magnetic conductive core(s) in the stator coil(s) is in a numerical range of 0.1 mm to 0.3 mm.

* * * * *